May 31, 1938.　　　G. SLAYTER　　　2,119,259

METHOD OF MAKING ARTICLES OF VITREOUS MATERIAL

Original Filed June 15, 1932　　2 Sheets-Sheet 1

Inventor
James Slayter
By J. F. Rule
Attorney

May 31, 1938.　　　　G. SLAYTER　　　　2,119,259
METHOD OF MAKING ARTICLES OF VITREOUS MATERIAL
Original Filed June 15, 1932　　2 Sheets-Sheet 2
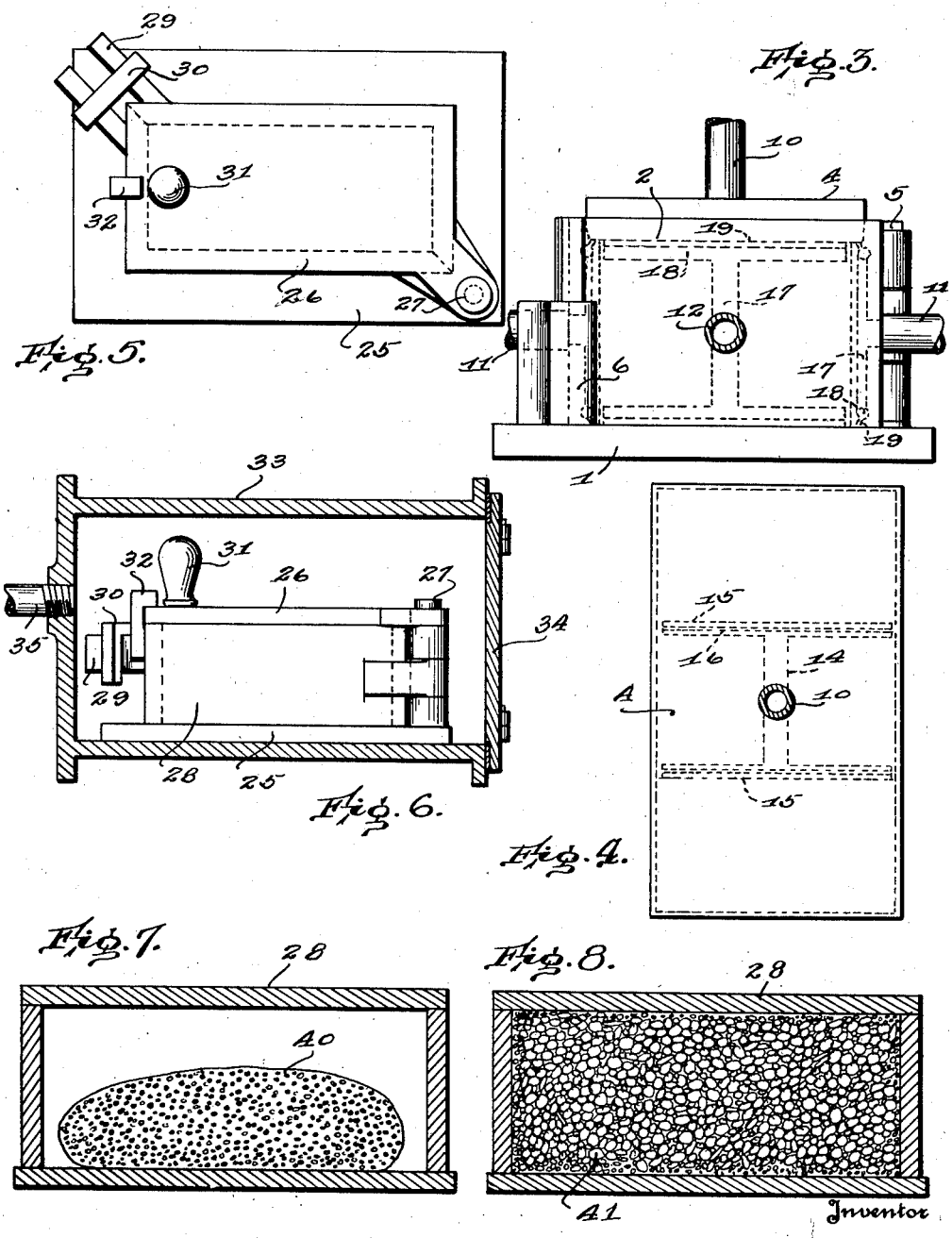

Patented May 31, 1938

2,119,259

UNITED STATES PATENT OFFICE 2,119,259

METHOD OF MAKING ARTICLES OF VITREOUS MATERIAL

Games Slayter, Newark, Ohio, assignor to Owens-Illinois Glass Company, a corporation of Ohio Application June 15, 1932, Serial No. 617,449
Renewed October 27, 1937

7 Claims. (Cl. 49—79)

My invention relates to making blocks or other articles of vitreous material, and comprises a method in which the material while in a molten or plastic condition is subjected to a vacuum which causes incased air or other gas to expand the material. The expansion may take place within a mold by which the article is molded to any desired shape.

An object of the invention is to provide a novel and improved method of making hollow articles, as, for example, building blocks of glass, slag or like material. The invention comprises a method of making such articles by introducing the molten material into a mold, exhausting the air from the mold, and causing the article to be expanded to the shape of the mold by the pressure of air or gas confined within such material.

A further object of the invention is to provide an improved building block which can be made by the above method. Building blocks of glass or like material have heretofore been made to a limited extent. These are ordinarily made by molding a hollow block open at one side, and a separate lid or cover piece which is cemented or otherwise attached to form a closure for the hollow block. In the manufacture of blocks of this type, it is necessary to hermetically seal the cover piece to the body of the block in order to prevent "breathing", moisture condensation within the block, etc. Much difficulty has been encountered in attempts to provide a satisfactory seal. An object of the present invention is to overcome these difficulties by providing a hermetically sealed hollow block made in a single piece expanded in a mold by the method above referred to. A block thus made does not permit air leakage. Also, owing to the vacuum within the block, it has a high insulating value.

A further object of the invention is to provide an improved insulating material by the method above indicated, said material being in the form of rectangular blocks or other desired shape and having a light, porous structure formed by small gas pockets or bubbles which permeate the mass. These pockets may be hermetically sealed one from another and contain a partial vacuum, thereby providing a material of value as an insulator and for many other purposes. A block of insulating material made in this manner has a very high insulating value, is light in weight, and has a high resistance to moisture and weathering.

Other objects of the invention will appear hereinafter.

In the accompanying drawings:

Fig. 3 is an end elevation of the mold.

Fig. 4 is a top plan view of a mold cover.

Fig. 5 is a top plan view of a modified form of mold.

Fig. 6 is a sectional elevation of a vacuum chamber with a mold therein.

Fig. 7 is a sectional view of a mold and a gob of glass therein before the vacuum is applied.

Fig. 8 is a view similar to Fig. 7, showing the material expanded within the mold.

Figure 1:
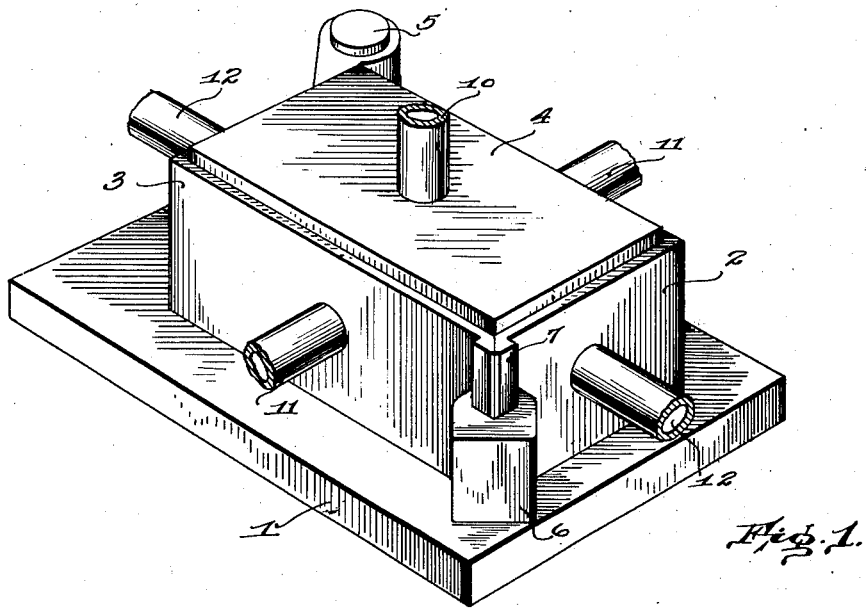
Fig. 1 is a perspective view of a mold adapted for use in practicing the present method.
Figure 2:
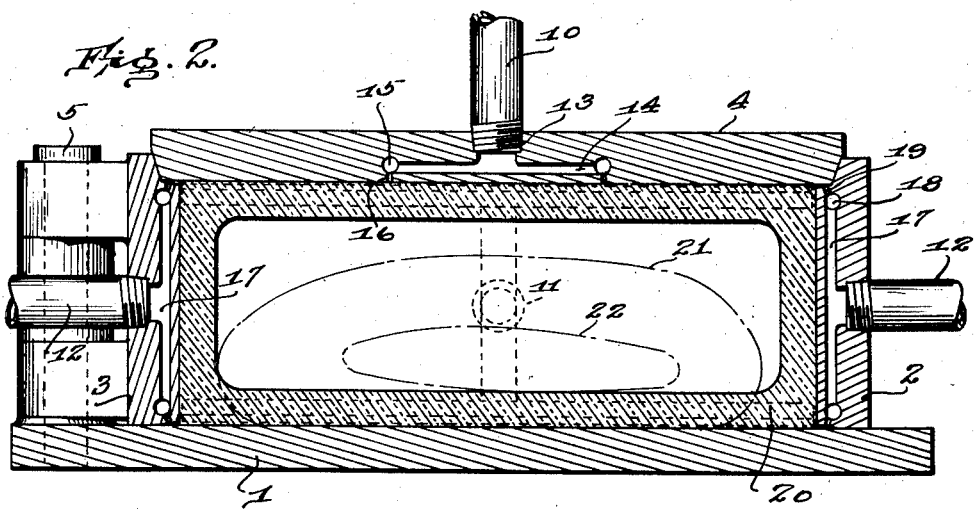
Fig. 2 is a longitudinal sectional view of the same.

Referring particularly to Figs. 1 and 2, there is shown a mold comprising a base 1, a mold body comprising separable sections 2 and 3, and a top or cover plate 4. The sections 2 and 3 are pivotally connected to swing horizontally to and from each other about the axis of a pivot pin 5 secured to the base 1. The sections 2 and 3 are locked in closed position by a clamping block 6 which is slidable vertically on clamping members or ribs 7 formed on the mold sections. The cover 4 is adapted to be moved vertically to and from mold closing position.

Means are provided for quickly exhausting the air from the mold, such means including a pipe or conduit 10 leading from the top of the mold, and pipes 11 and 12 leading from the sides and ends, respectively. The pipe 10 is screw threaded into an opening 13 extending into the mold wall and communicating with a channel 14 (Figs. 2 and 4), the latter opening into channels 15 extending across the cover plate. The channels 15 open through narrow slots 16 into the mold. The pipes 11 and 12 are connected in like manner through vertical channels 17 and horizontal channels 18 with slots 19 extending along all of the vertical and horizontal interior edges of the mold. This construction permits the air to be quickly exhausted from the mold in a manner hereinafter pointed out. The vacuum pipes 10, 11 and 12 are all connected to a vacuum apparatus (not shown) by which the air may be quickly and simultaneously withdrawn from all of said pipes and and from the mold cavity through the slots 16 and 19.

As shown in Fig. 2, the apparatus is adapted for forming hollow blocks 20 of glass or similar material. In making such a block in accordance with the present invention, a gob or mass of glass 21 containing an air pocket or bubble 22 sealed therein is first introduced into the mold in any usual or approved manner. The gob may be made by any approved method, as for example, by gathering a charge of glass on a pontil in the usual manner, blowing it to hollow form and then simultaneously pinching and severing it from the pontil, thus forming a charge or gob of glass with an air pocket sealed therein. The gob is dropped or laid in the mold through the open upper side thereof and the cover 4 then lowered to close the mold. The vacuum pipes 10, 11 and 12 are then simultaneously opened to the vacuum chamber or source of vacuum. This causes the air to be quickly exhausted from the interior of the mold through the slots 16 and 19. The air within the pocket 22 immediately expands the gob of plastic glass, causing it to take the shape of the mold and thereby produce the hollow glass block 20. After the glass has cooled and hardened sufficiently to retain its shape and withstand atmospheric pressure, the mold is opened and the block transferred to an annealing leer and annealed in the usual manner.

A block produced by the above method and of the shape herein shown is well adapted for use as a building block. It has ample strength and hardness, is comparatively light in weight, durable, impervious to moisture, and is a good heat insulator both on account of the insulating properties of glass and also because it is vacuumized to a considerable degree. Its transparency, adaptability for molding to any desired shape or size within wide limits and for surface ornamentation, adapt it for use as a building material. This, however, is only one of the purposes for which the invention is employed.

Figs. 5 and 6 illustrate a modified form of mold comprising a base 25, a cover plate 26 mounted to swing horizontally on a hinge pin 27 secured to the base, and a mold body 28 comprising horizontally separable sections hinged on the pin 27. The body sections 28 are opened and closed by means of handles 29 and are locked in closed position by a clamping yoke 30. The cover 26 is moved by means of a handle 31. As the cover plate 26 is swung to closed position, it engages beneath a lug 32 which holds it in closed position.

The mold with the charge of glass therein is adapted to be placed in a vacuum chamber 33, the latter provided with a door 34. A vacuum pipe 35 leads from the chamber to a source of vacuum (not shown). The apparatus shown in Figs. 5 and 6 is also adapted for making blocks such as above described and shown in Fig. 2. The gob of glass 21 is introduced into the mold and the latter closed and then placed in the vacuum chamber. The door 34 is then closed and the air exhausted from the chamber 33 through the pipe 35. The air is thereby exhausted from the interior of the mold, there being sufficient space between the meeting edges of the mold walls to permit the air to quickly escape.

Figs. 7 and 8 illustrate the manufacture of a cellular block of vitreous material. In the manufacture of such block, a gob 40 is first produced, said gob consisting of glass or similar material which is permeated with small bubbles or pockets containing air or other gas. This gob in a molten or plastic state is placed in the mold, the latter closed and the air then exhausted in the manner above described. The confined gases within the mass immediately expand, causing the mass as a whole to expand and fill the mold, as shown in Fig. 8. There is thus formed a block 41 of vitreous material having throughout its structure a multiplicity of small pockets or openings containing a rarefied gas, the individual pockets being sealed and separated one from another by thin cell walls. The vacuum is maintained until the material has cooled and hardened sufficiently to withstand atmospheric pressure, after which the mold is opened, the block removed and annealed. Material produced in this manner may be made very light and porous, being known in the trade as "glass foam". Its density, weight, size of individual cells and other properties may be regulated and modified to meet varying requirements, by variations in the materials used and other variable factors which can be regulated and controlled.

The air or other gas may be introduced and mixed in the gob 40 by various methods. For example, the air may be stirred into the molten glass by mechanical stirring devices either before or after the gob of glass 40 is severed from the supply body. Moreover, there is a large amount of dissolved air in molten glass which is sufficient to expand the glass in the manner above described without necessitating the introduction of additional air or gas. Other methods of introducing the expanding gas into the molten material are contemplated, but do not in themselves form a part of the present invention and are, therefore, not disclosed herein. One such method is disclosed in Patent No. 1,912,017, May 30, 1933, granted on my copending application Serial Number 564,706, filed September 23, 1931. A further method is disclosed in my Patent No. 1,697,375, July 24, 1934, granted on my copending application Serial Number 617,448, filed June 15, 1932.

The block 41, as shown, is rectangular in form but may be molded in any other desired shape, practically the only limitation being that it must be of a shape which will permit it to be removed from the mold. It should be noted that the surface portions of the block are much more dense than the interior, thus forming an outer shell or casing which greatly increases the strength of the block and particularly adapts it for use in building walls or the like of insulating material, or as a facing for other walls. This greater density of the exterior surface is due in part at least to the fact that the surface of the gob 40 before it is expanded in the mold, is chilled to a certain extent, forming a skin or coating which, when the gob is expanded in the mold, is comparatively cold, preventing expansion of the gases to the same extent as takes place in the more fluent interior portion of the mass.

What I claim is:

1. The method which comprises sealing an air bubble in a mass of vitreous material while the latter is in a plastic condition, reducing the pressure on the entire exterior surface of the mass and thereby permitting the latter to be expanded by the internal pressure of the sealed air, and molding the mass to a predetermined shape simultaneously with said expansion.

2. The method which comprises producing a mass of molten or plastic vitreous material containing a multiplicity of small gas pockets or bubbles permeating the mass, introducing the mass into a mold, and exhausting from the mold the air surrounding said mass, and thereby causing the mass to be expanded by the gas in said pockets and fill the mold.

3. The method which comprises permeating a mass of vitreous material with a multiplicity of minute gas pockets or bubbles while the mass is in a molten condition, and reducing the pressure on the external surface of the mass and thereby permitting the mass to be expanded by the internal pressure of the gas in said pockets.

4. The method which comprises permeating a mass of vitreous material with a multiplicity of minute gas pockets or bubbles while the mass is in a molten condition, reducing the pressure on the external surface of the mass and thereby permitting the mass to be expanded by the internal pressure of the gas in said pockets, and molding the mass to a predetermined shape simultaneously with said expansion.

5. The method which comprises producing a mass of molten vitreous material of predetermined size and shape, permeating the mass with a multiplicity of minute gas pockets or bubbles, introducing the mass as a whole into a confined space, decreasing the air pressure within said space while the said mass is still plastic, and cooling and hardening the mass.

6. The method of forming a vitreous block which comprises sealing a gas within a vitreous mass while the latter is soft and plastic, then enclosing the vitreous mass within a mold, thereafter expanding the mass within the mold by exhausting from the mold, the air or gas which envelops the mass and thereby causing the sealed gas to expand the mass and shape it to the mold, and causing the mass to harden within the mold and thereby retain its shape.

7. The method which comprises sealing a single gas bubble in a mass of vitreous material while the entire mass is in a plastic condition, and reducing the pressure on the entire exterior surface of the mass below atmospheric pressure and thereby causing the entire mass to be expanded by the internal pressure of the sealed gas.

GAMES SLAYTER.